United States Patent [19]

Ball

[11] 4,239,830
[45] Dec. 16, 1980

[54] WEBBED PLASTIC TUBING

[76] Inventor: Harry Ball, 116 Wyckoff Ave., Piscataway, N.J. 08854

[21] Appl. No.: 24,961

[22] Filed: Mar. 29, 1979

[51] Int. Cl.³ .............................................. B29C 17/14
[52] U.S. Cl. ..................................... 428/136; 264/146; 264/154; 264/163; 264/209; 264/210.1; 264/DIG. 47
[58] Field of Search ............... 264/146, 156, 209, 154, 264/563, 569, 565, 145, 163, 237, DIG. 47, 210.2, 210.1; 425/290, 305.1; 428/36, 136

[56] References Cited

U.S. PATENT DOCUMENTS

| 2,361,369 | 10/1944 | Grebe et al. | 264/146 |
| 3,183,571 | 5/1965 | Schmunk et al. | 264/156 |
| 3,313,870 | 4/1967 | Yazawa | 264/565 |
| 3,790,652 | 2/1974 | Colijn et al. | 264/146 |
| 3,819,790 | 6/1974 | North et al. | 264/569 |
| 3,841,815 | 10/1974 | Labarre | 425/290 |
| 3,947,174 | 3/1976 | Hureau et al. | 425/290 |

*Primary Examiner*—Jeffery R. Thurlow
*Attorney, Agent, or Firm*—Burgess, Ryan and Wayne

[57] ABSTRACT

A method and apparatus for making webbed plastic tubing suitable for use as a support for a filter pad in a cartridge filter. The webbed tubing is made by extruding a thermoplastic polymer in the form of a tube, cutting slits in the tube, and expanding the still warm and plastic tube by passing it over a mandrel slightly larger in diameter than the unexpanded tube.

7 Claims, 12 Drawing Figures

FIG.4a
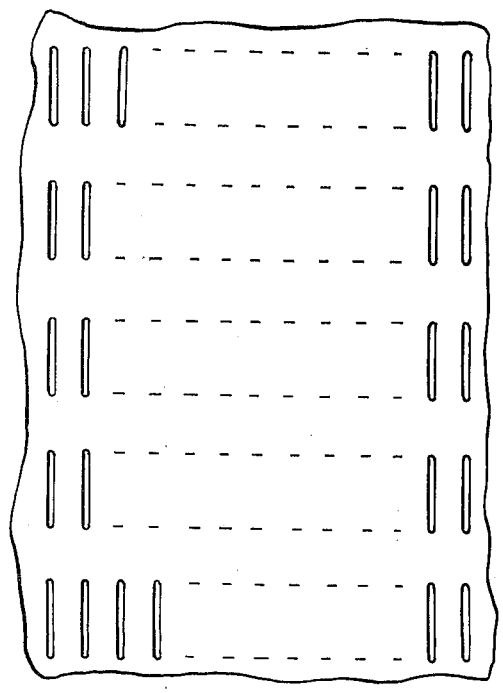
FIG.4b
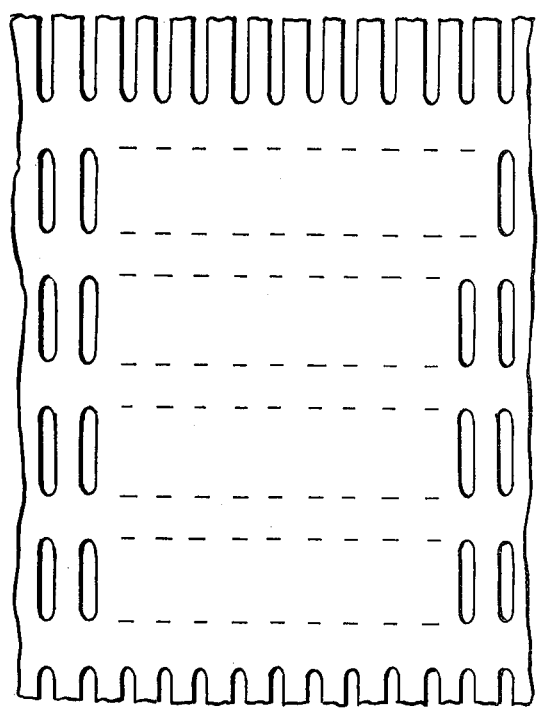
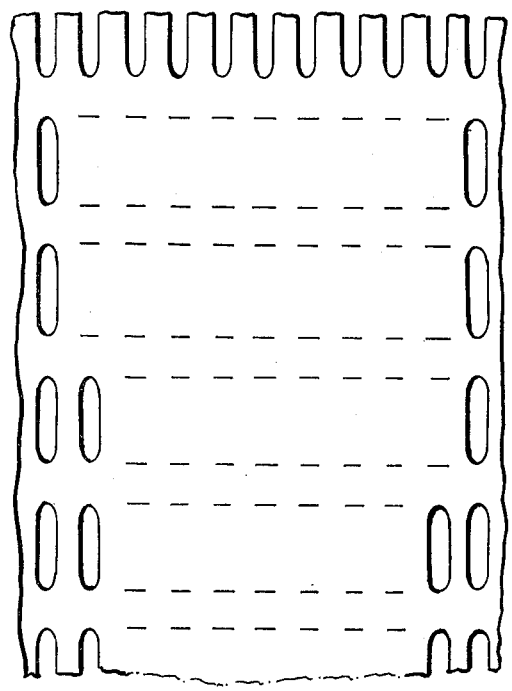
FIG.4c

FIG. 5a
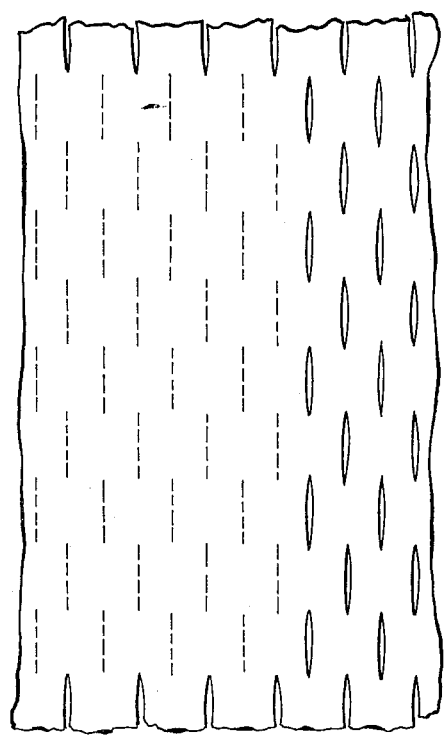
FIG. 5b
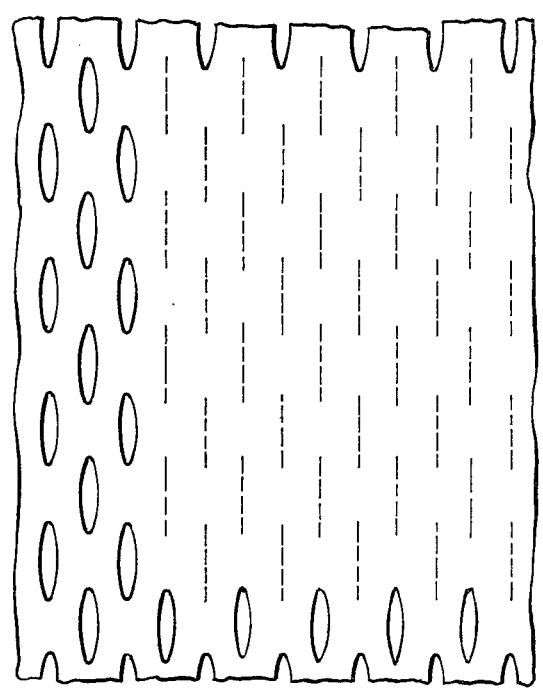
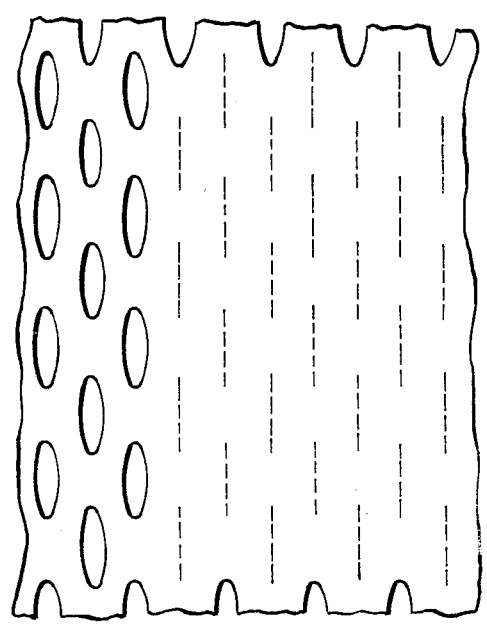
FIG. 5c

FIG.6a
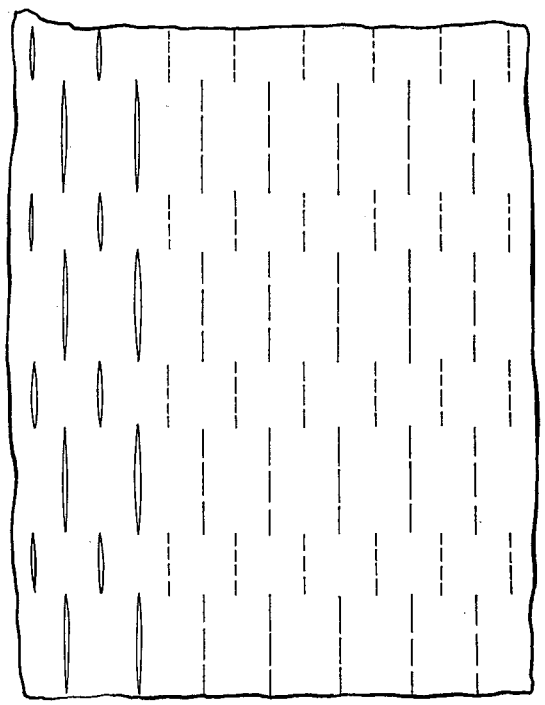
FIG.6b
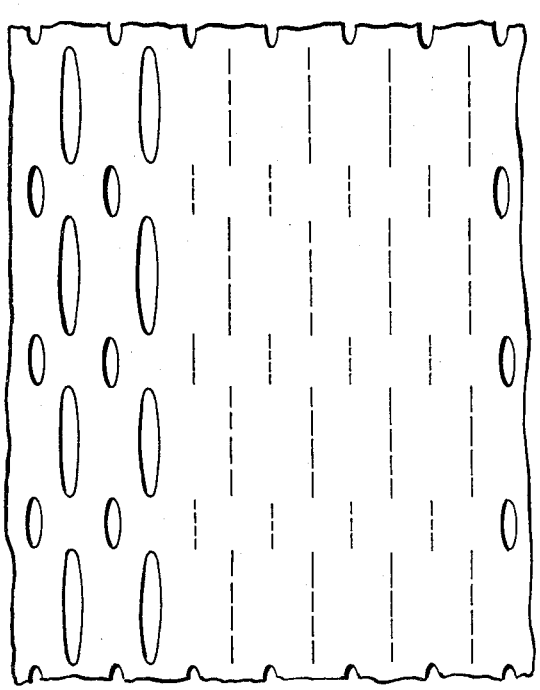
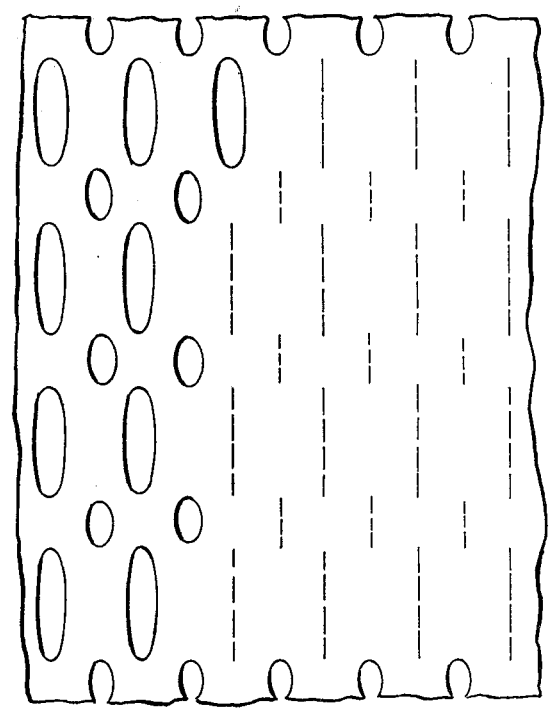
FIG.6c

WEBBED PLASTIC TUBING

BACKGROUND OF THE INVENTION

This invention relates to plastic tubing and, more particularly, this invention relates to webbed plastic tubing. The webbed plastic tubing is particularly useful as a support for a filtering medium, although there are numerous other uses such as protective sleeves for machined shafts during shipping; decorative items like candle holders, lamp shades, and packaging material; protective coverings for seedling trees; and the like. Examples of the use of the webbed plastic tubing as packaging material are onion bags, potato bags, etc. As a protective cover for seedling trees, the tubing is particularly useful in reforestation. The seedlings are covered with the webbed tubing made of polypropylene. The tubing protects the seedlings from animals, yet admits enough light for growth. Since the polypropylene is photodegradable, the cover deteriorates by the time the tree is self-sustaining.

The preferred use, however, is as a support for filter media and the following description will refer thereto, although it should be distinctly understood that the invention is not limited thereto. In a typical installation, there are one or more cartridge filters disposed in a pressure vessel, each one being 2½ to 3 inches in diameter and 10 to 60 inches long. In each cartridge housing there is a tubular support and a filter on the support. Typically the filter medium or pad is a needled polypropylene felt.

In many types of filtering systems it is necessary to provide a support for the filter medium which is rigid yet permeable. In installations where a flat support is called for, it is fairly simple to provide a foraminous material such as screening. In other types of installations, supports of a more complex shape are needed. The support is often tubular in shape for use in cartridge filters. Such tubular supports are often made by perforating a plastic pipe or tube. Since this is usually a manual operation, it is expensive to make.

Another method of making tubular supports involves extruding a plurality of separate strands and crossing the strands at the diehead of the extruder to form a porous tube which resembles a woven product. The cost of making such a product is also rather high.

BRIEF SUMMARY OF THE INVENTION

It is, therefore, a primary object of the present invention to provide a webbed plastic pipe or tube which is useful as a filtering medium support and is free of the aforementioned and other such disadvantages.

It is another object of the present invention to provide a method of making a webbed plastic pipe which is simple and inexpensive to practice.

It is a further object of the present invention to provide a method of making a webbed plastic pipe or tube which is adaptable to make any predetermined pattern of sizes and shapes of voids in the pipe or tube.

Consistent with the foregoing objects, the present method comprises the steps of extruding a thermoplastic polymer to form a pipe or tubing, cutting a plurality of slits in the pipe or tubing in a predetermined pattern and of a predetermined size while the pipe or tubing is still warm and plastic, and passing the pipe or tubing over a mandrel which is slightly larger in diameter than the pipe or tubing to thereby expand the pipe or tubing and cause the slits to enlarge and form a pattern of voids in the pipe or tubing.

In this application, the word "tubing" will be used to denote a pipe or tubing.

BRIEF DESCRIPTION OF THE DRAWINGS

The aforesaid objects, and other objects will become apparent when consideration is given to the following detailed description along with the annexed drawings, in which:

FIGS 4a, 4b, and 4c show a particular pattern of slits unexpanded, at 12½% expansion, and at 25% expansion, respectively;

FIGS. 5a, 5b, and 5c show another pattern of slits unexpanded, at 12½% expansion, and at 25% expansion, respectively; and FIGS. 6a, 6b, and 6c show still another pattern of slits unexpanded, at 12½% expansion, and at 25% expansion, respectively.

DETAILED DESCRIPTION OF THE INVENTION

Figure 1:
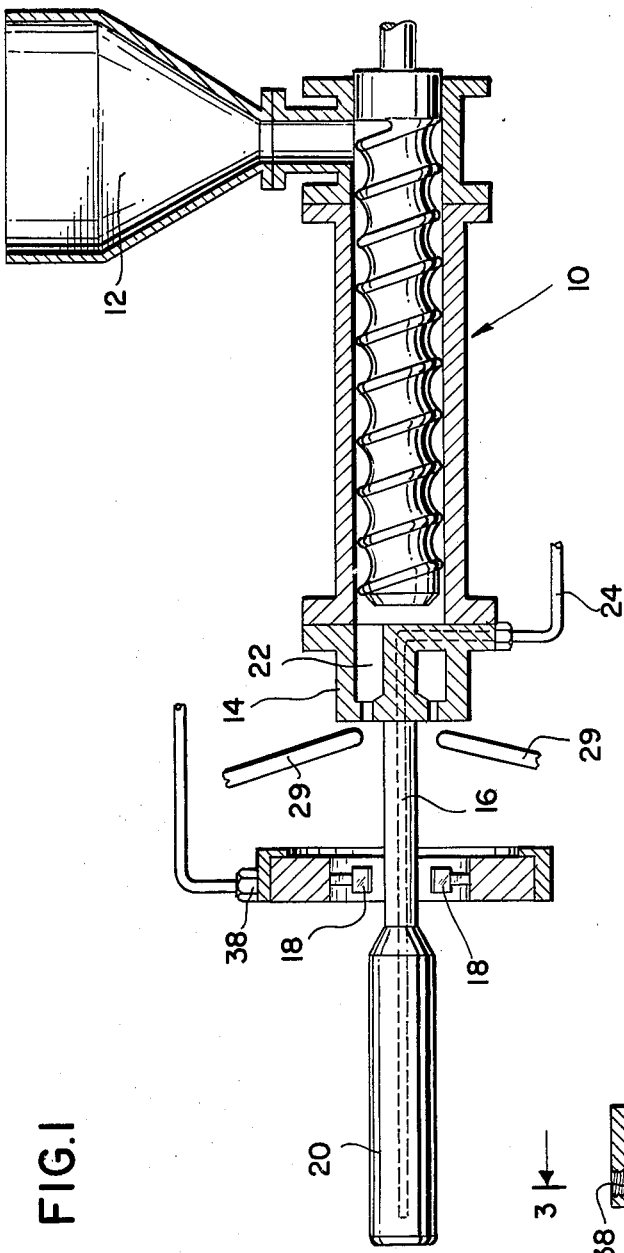
FIG. 1 is a schematic side elevational view of the apparatus used to practice the method of the present invention.

Referring first to FIG. 1, a thermoplastic polymer is fed to screw extruder 10 from hopper 12, it being understood that screw extruder 10 is a device well-known in the art and requires no lengthy description. The heated, molten, polymer is extruded through the die, or extruder head 14. It is to be distinctly understood that this invention is not limited to any particular polymer. Generally any extrudable polymer may be used. This includes the thermoplastic resins exemplified by the polyolefins such as polyethylene, polypropylene, and the like; polyamides such as the nylons; polyacrylonitrile resins; linear polyesters; polyvinyl chloride; polyvinylidine chloride; polyvinyl butyral; polyvinyl acetate; polystyrene; linear polyurethane resins; polysulfone; and cellulose derivatives such as cellulose propionate, cellulose acetate propionate, cellulose acetate butyrate, and cellulose butyrate, as well as the thermoplastic elastomers having the properties of ABS rubber.

The tubing emerges from die 14 at a temperature of about 350° to 425° F. and passes along anvil 16 where the slits are made by knife blades 18 which will be described at greater length hereinbelow. At this location, the tubing has cooled to about 300° to 320° F. The still warm and plastic tubing then passes over a mandrel 20 to be expanded.

Figure 2:
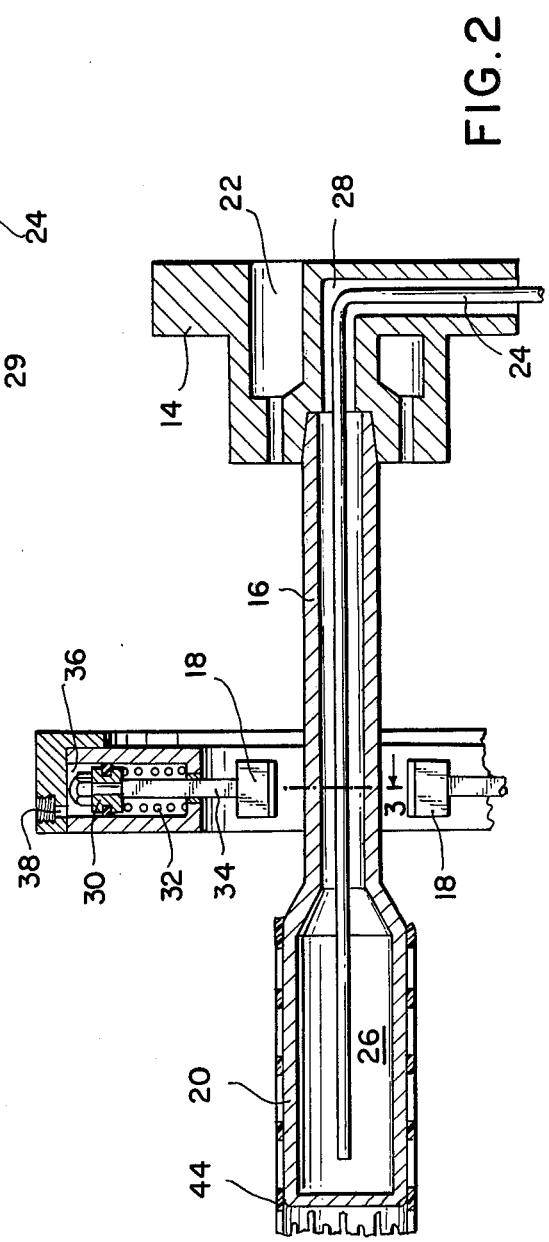
FIG. 2 is a side elevational view, in cross-section, of a part of the apparatus of FIG. 1.

Turning to FIG. 2, it will be seen that die head 14 has a plastic melt cavity 22 from which the polymer is extruded. Cooling means for the die head 14, anvil 16, and mandrel 20 is provided. The cooling means comprises a water inlet line 24 passing into die 14 and extending the length of anvil 16 and mandrel 20, being coaxial therewith. The cooling water passes into heat exchange chamber 26 and from there to return water chamber 28 from which it leaves the die 14. Conventional external air blowers 29 are provided to assist in cooling the extruded tubing as it emerges from the die head (FIG. 1).

The cutting means each comprise a hydraulic piston arrangement having piston 30 normally biased in a direction outwardly from anvil 16 by spring 32. A shaft 34 extends toward the anvil 16 from piston 30. Shaft 34 is preferably square in cross-section to prevent rotation. Hydraulic fluid enters cylinder 36 through inlet 38 to force piston 30 toward anvil 16. When piston 30 is urged toward anvil 36, knife blade 18 cuts a slit in the tubing. The hydraulic pressure is released and spring 32 urges the piston 30 away from the anvil 16. It will be understood by one skilled in the art that the number and placement of the cutting means is easily determined to obtain the desired result.

The tubing, after being slit by the cutting means, passes over mandrel 20 where it is stretched and cooled. When stretched, the slits in the tubing are enlarged to form the desired pattern of openings in the tubing. Mandrel 20 is fabricated of aluminum and has a coating 40 of polytetrafluoroethylene thereon.

Figure 3:
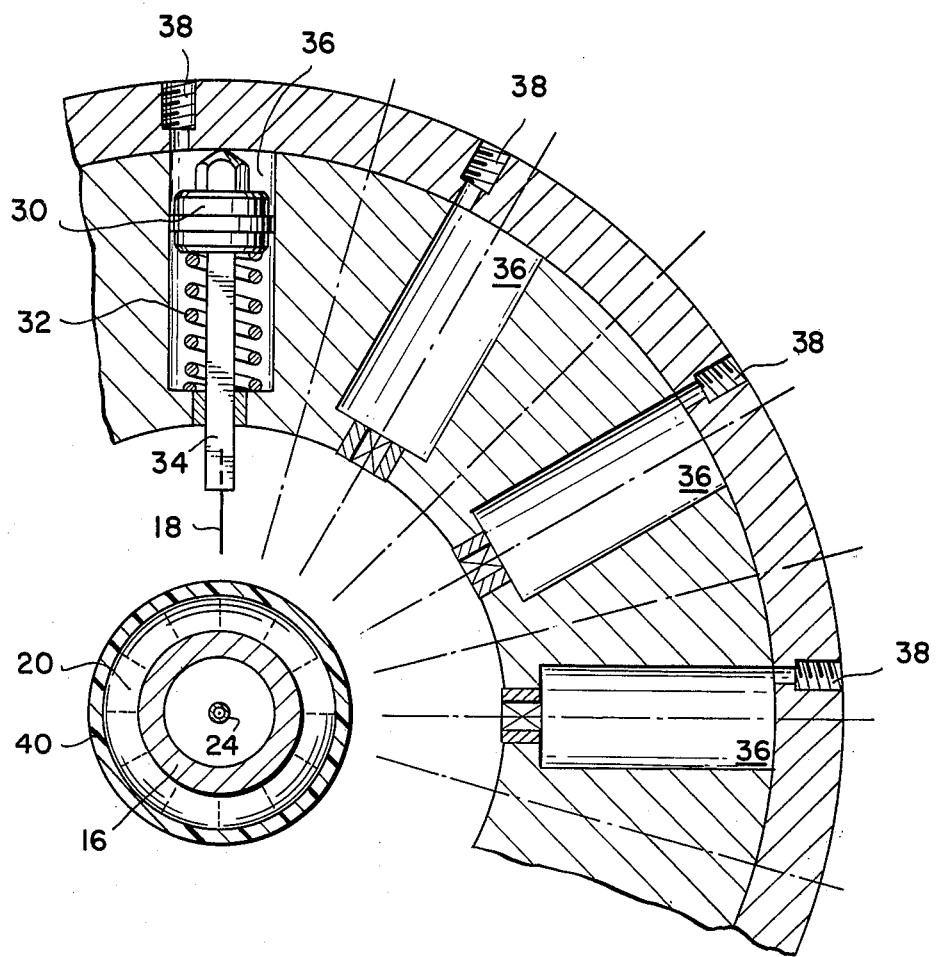
FIG. 3 is a transverse cross-sectional view taken along the line 3—3 of FIG. 2, showing extruded tubing in place.

In FIG. 3 there is shown one arrangement having 24 knife blades 18 evenly spaced about 360° around anvil 16, with extruded tubing 44 in place on the anvil 16, although for purposes of illustration, only one cutting means is shown, while the location of the others are shown schematically.

The pattern and ratio of void area to solid area can easily be predetermined by one skilled in the art by varying the size and placement of slits and varying the amount of expansion to suit the requirements of the particular installation. Generally, a void area of about 35 to 48% is desirable for a support in a cartridge filter.

Referring to FIG. 4a, there is shown an enlarged photograph of a uniform pattern of slits of uniform size in "unexpanded" condition. For purposes of illustration only, the slits were slightly expanded manually to allow light to show through. In FIG. 4b, the tubing was expanded 12½% by following the inventive method. In FIG. 4c, the tubing was expanded 25% by passing it over the mandrel while still warm and plastic.

FIG. 5a shows a pattern of slits of uniform size, but in staggered rows. FIGS. 5b and 5c show the tubing at 12½% and 25% expansion, respectively.

FIG. 6a shows a pattern of staggered rows of long and short slits. FIGS. 6b and 6c show the tubing at 12½% and 25% expansion, respectively.

While knife blade 18 is shown as being linear, that is, of a shape to cut a straight slit, one skilled in the art will appreciate that it could be arcuate or have a more complex shape such as cruciform, depending on the desired shape of the slits. Also, shaft 34 is shown as being integral with piston 30 although there are many conventional "quick-release" mechanisms apparent to one skilled in the art for mounting knife blades 18 to piston 30 to adapt interchangeable blades to the apparatus.

It will be appreciated that the objects set forth at the outset have been successfully achieved by reference to preferred embodiments which are only exemplary and are not to be taken as limiting. The invention is defined only by the appended claims.

What is claimed is:

1. A method for making non-woven webbed plastic tubing, comprising the steps of:
    forming a tubular member by extruding a thermoplastic polymer onto the smaller diameter end of an elongated cylindrical shaft having a larger diameter other end constituting a mandrel, with a frustoconical transition portion between said ends;
    cooling the extruded tubular member to a temperature at which the polymer is still warm and plastic;
    cutting a plurality of slits in the cooled tubular member by reciprocating against said smaller diameter end of said shaft adjacent said transition portion, a plurality of longitudinally oriented knife blades disposed radially of said shaft, to form a corresponding plurality of longitudinally elongated slits in said cooled tubular member; and
    moving said cooled slitted tubular member along said shaft, through said transition region and onto said mandrel to enlarge the diameter of said tubular member and increase the size of the slits therein.

2. A method as defined in claim 1, wherein said polymer is a polyolefin, a polyamide, polyacrylonitrile, a linear polyester, polyvinyl chloride, polyvinylidine chloride, polyvinyl butyral, polyvinyl acetate, polystyrene, linear polyurethane, polysulfone, cellulose propionate, cellulose acetate propionate, cellulose acetate butyrate, cellulose butyrate, or acrylonitrile-butadiene-styrene rubber.

3. A method as defined in claim 2, wherein said polymer is polyethylene or polypropylene, which is extruded at about 350° to 425° F., further comprising the step of cooling the extruded tubing to about 300° to 320° F. before cutting said slits.

4. A method as defined in claim 1, wherein said mandrel is of a diameter sufficient to expand said tubing by up to about 25%.

5. A method as defined in claim 4, wherein said mandrel is of a predetermined diameter to expand said tubing about 12½%.

6. A method as defined in claim 4, wherein said mandrel is of a predetermined diameter to expand said tubing about 25%.

7. A product made by the process of one of claims 2, 3, 4, 5, 6 or 1.

* * * * *